United States Patent [19]

Rosen

[11] Patent Number: 5,324,595
[45] Date of Patent: Jun. 28, 1994

[54] COMPOSITE TUBE
[75] Inventor: Jonas Rosen, Sandviken, Sweden
[73] Assignee: Sandvik AB, Sandviken, Sweden
[21] Appl. No.: 932,692
[22] Filed: Aug. 20, 1992
[30] Foreign Application Priority Data
Aug. 21, 1991 [SE] Sweden ................... 9102410
[51] Int. Cl.$^5$ .................. F16L 9/02; B32B 1/08; B32B 15/18
[52] U.S. Cl. .................. 428/679; 428/683; 428/685; 138/143
[58] Field of Search ............ 428/586, 678, 679, 685, 428/683; 138/142, 143

[56] References Cited
U.S. PATENT DOCUMENTS

| | | | |
|---|---|---|---|
| 3,712,317 | 1/1973 | Hayashi et al. | 428/683 |
| 4,325,994 | 4/1982 | Kitashima et al. | 428/679 |
| 4,463,061 | 7/1984 | Otoguro et al. | 428/678 |
| 4,505,232 | 3/1985 | Usami et al. | 138/143 |
| 4,556,240 | 12/1985 | Yoshida | 138/143 |
| 4,685,427 | 8/1987 | Tassen et al. | 138/143 |
| 4,798,635 | 1/1989 | Bernhardsson et al. | 148/325 |
| 4,917,969 | 4/1990 | Pirchon et al. | 428/679 |
| 4,943,489 | 7/1990 | Kuhara et al. | 138/143 |
| 5,056,209 | 10/1991 | Ohashi et al. | 138/143 |
| 5,103,870 | 4/1992 | Ishii et al. | 428/678 |

Primary Examiner—John Zimmerman
Attorney, Agent, or Firm—Burns, Doane, Swecker & Mathis

[57] ABSTRACT

A composite tube with improved resistance to thermal fatigue and stress corrosion for use in soda recovery units comprising an inner tubing of a conventional carbon steel and an outer liner of a Cr—Ni—Mo—Fe-based alloy with austenitic structure which alloy contains, in weight-%, 0.01–0.04 C, 19.5–23.5 Cr, 38–46 Ni, 2.5–3.5 Mo, up to 0.5 Si, up to 0.3N, and the remainder being Fe, except normal impurities.

3 Claims, 4 Drawing Sheets

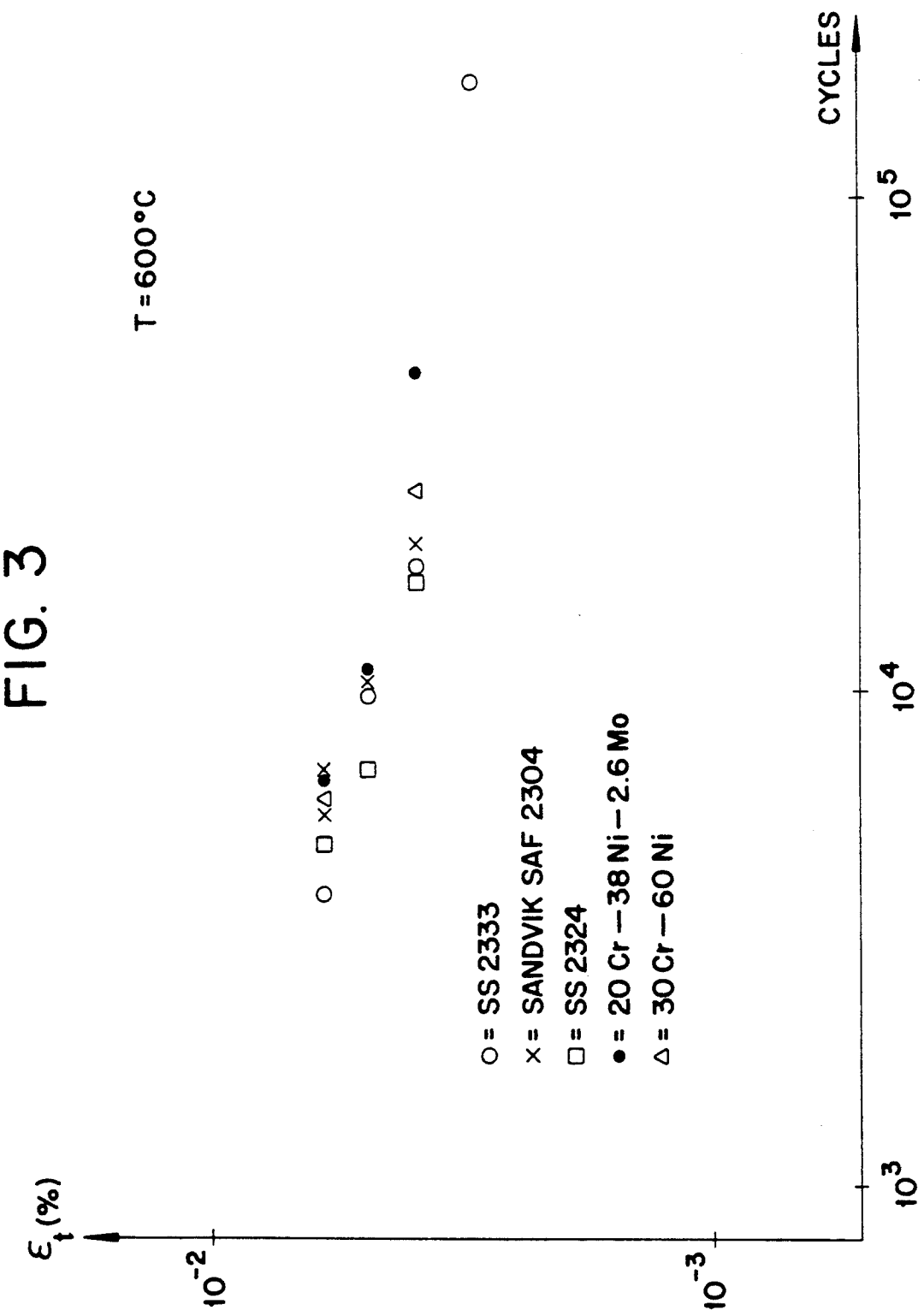

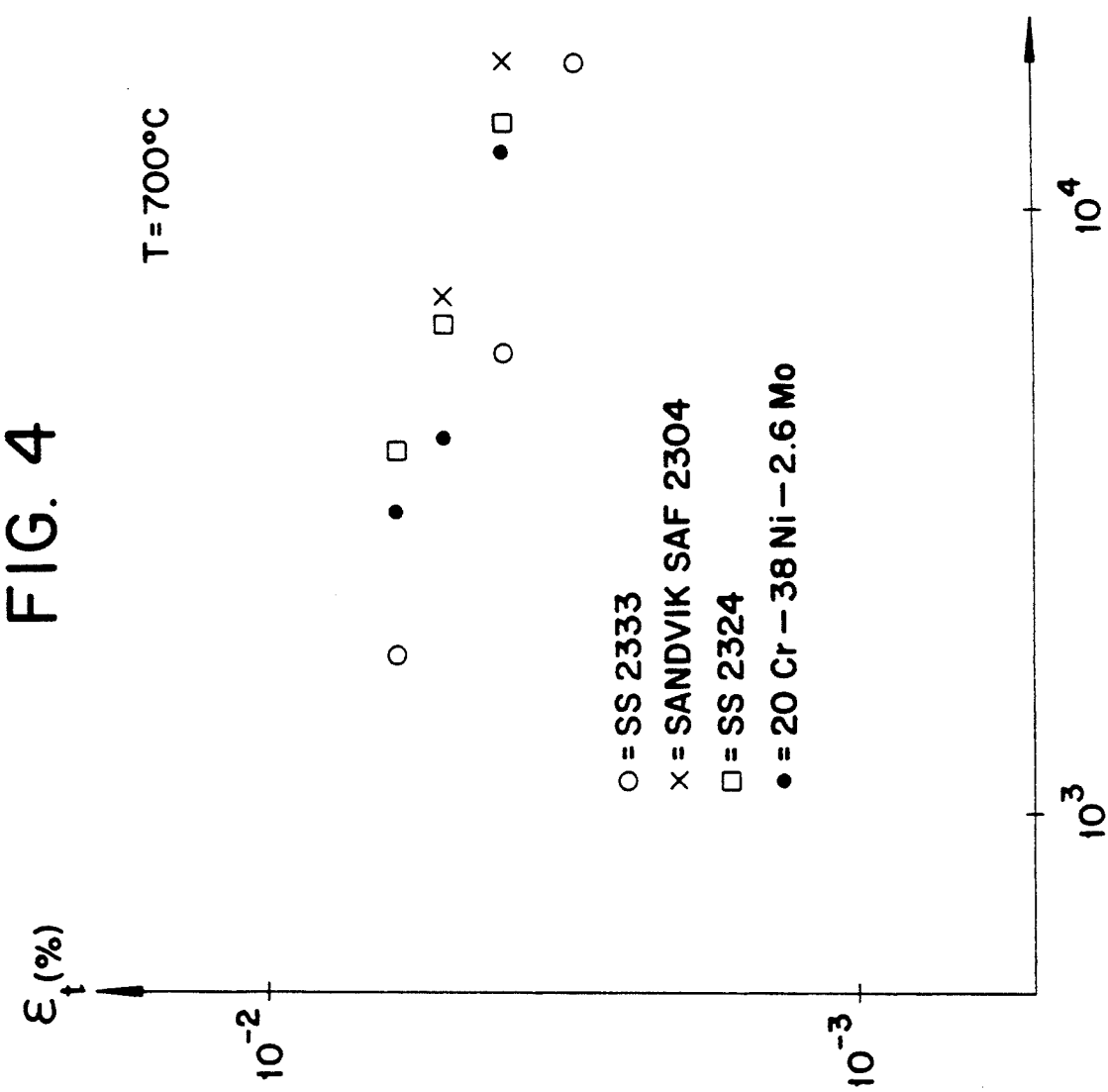

COMPOSITE TUBE

BACKGROUND OF THE INVENTION

The present invention relates to the use of an austenitic Cr—Ni—Mo-containing construction material for the manufacture of a composite tube with good resistance to thermal fatigue and stress corrosion when being used as bottom tubes for soda recovery units.

It has been found that the usage of such external tube material in a jointly extruded composite tube is especially advantageous when the inner tube is made of conventional carbon steel. A composite tube in this context means a compound tube of two tubular layers with a metallurgical bond therebetween. Such compound tubes are manufactured by co-extrusion or joint extrusion. Bottom tubes refer to tubes in the bottom of the soda recovery unit wherein feed water is led into the wall tubes (see FIG. 1). These bottom tubes are those tubes or parts of tubes which are disposed below the melt openings of the said soda recovery unit.

In conventional soda recovery units, the bottom tubes comprises either composite tubes of SS2333 corresponds to UNSS30409, ASTM A-213, grade Tp304H) or SS2352 corresponds to UNS S30403, ASTM A-213, grade Tp304L) as the external tube material and carbon steel as the internal tube material, or naked carbon steel tubes covered with a refractory layer. There is a disadvantage with such products since in most cases they suffer from crack formation in the outer tube component of SS2333 or SS2352 material after certain periods of service. The reason for this crack formation is both thermal fatigue due to melt breakage through the material and stress corrosion. There is no established unity of opinion in the industry about which of these factors has the dominating negative influence.

The present invention is based on the discovery that new material combinations in such composite tube applications could satisfy those requirements for construction materials used in bottom tubes in soda recovery units. The requirements to be satisfied are good thermal fatigue resistance and good stress corrosion resistance (in both hydroxide- and chloride-induced environments).

OBJECTS AND SUMMARY OF THE INVENTION

It is an object of this invention to avoid or alleviate the problems of the prior art.

It is also an object of the invention to provide an improved tube assembly for use in bottom tubes for soda recovery units having both good thermal fatigue resistance and good stress corrosion resistance.

The present invention provides a composite tube having improved resistance to thermal fatigue and stress corrosion comprising an inner portion of carbon steel and an outer portion of an austenitic Cr—Ni—Mo—Fe-based alloy comprising, in weight-%:

| | |
|---|---|
| C | 0.01–0.04 |
| Cr | 19.5–23.5 |
| Ni | 38–46 |
| Mo | 2.5–3.5 |
| Si | up to 0.5 |
| N | up to 0.3 |
| Fe | remainder (except normal impurities). |

BRIEF DESCRIPTION OF THE FIGURES

FIG. 3 is a graph of total elongation ($\epsilon_t$) vs. cycles at a temperature (T) of 600° C. for various test samples; and FIG. 4 is a graph of total elongation ($\epsilon_t$) vs. cycles at a temperature (T) of 700° C. for various test samples.

DETAILED DESCRIPTION OF THE PREFERRED EMBODIMENTS OF THE INVENTION

The invention comprises the usage of a Cr—Ni—Mo—Fe-based alloy with austenitic micro-structure containing, in weight-%:

| | |
|---|---|
| C | 0.01–0.04 |
| Cr | 19.5–23.5 |
| Ni | 38–46 |
| Mo | 2.5–3.5 |
| Si | up to 0.5 |
| N | up to 0.3 |
| Fe | remainder (except normal impurities) | as the external tube portion of a composite tube where the inner tube portion is made of conventional carbon steel and wherein such composite tube is made by joint extrusion.

Further details and advantages of the present invention will appear from the following description of an extensive test program that has been carried out. A number of possible outer components were selected due to their established resistance to stress corrosion. Also material SS2352 was included in this program for reference purposes. SS 1435 corresponds to ASTM A210, grade A-1.

Figure 1:
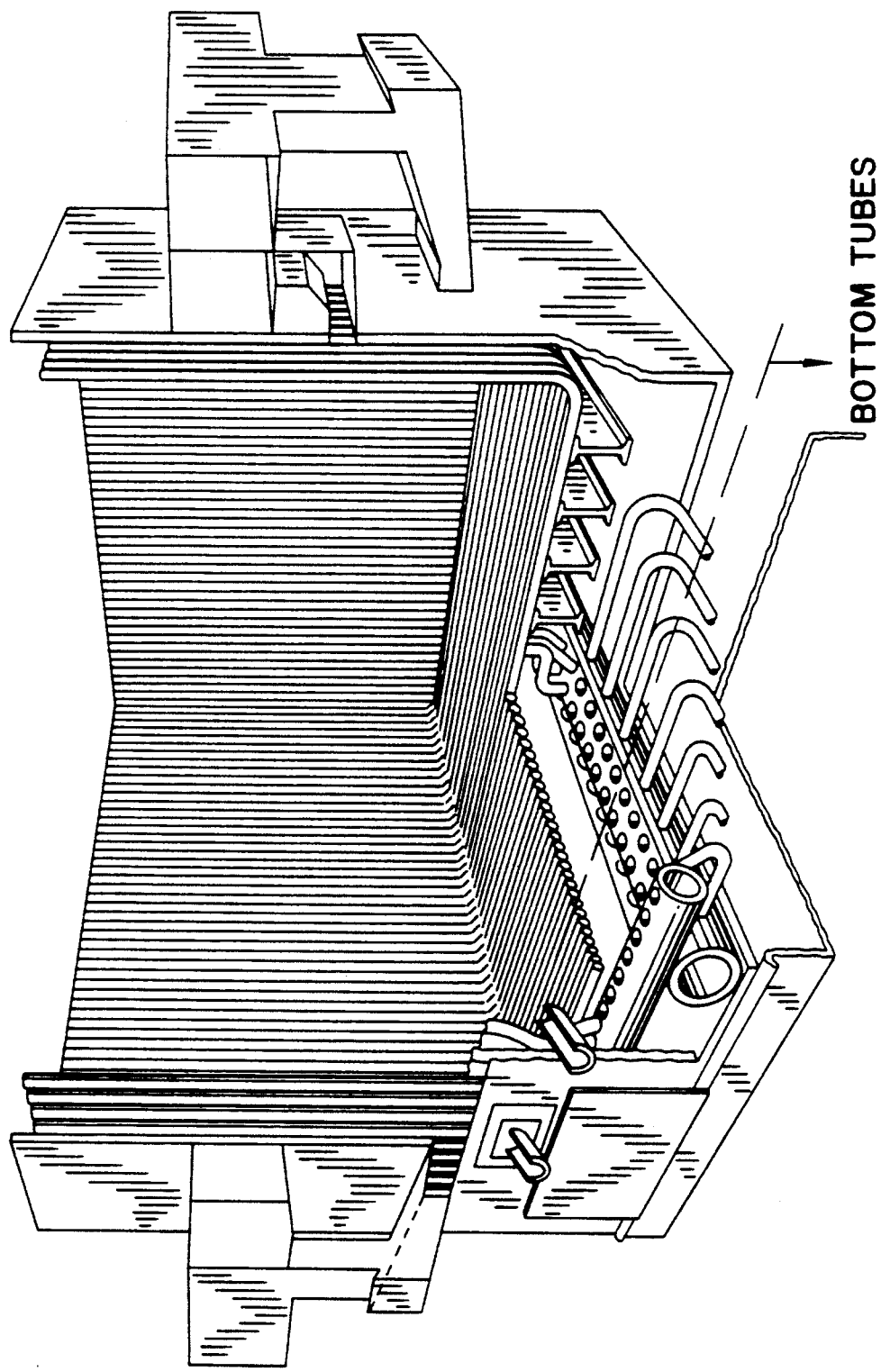
FIG. 1 is a partial cutaway view of a soda recovery unit showing the bottom tubes.
Figure 2:
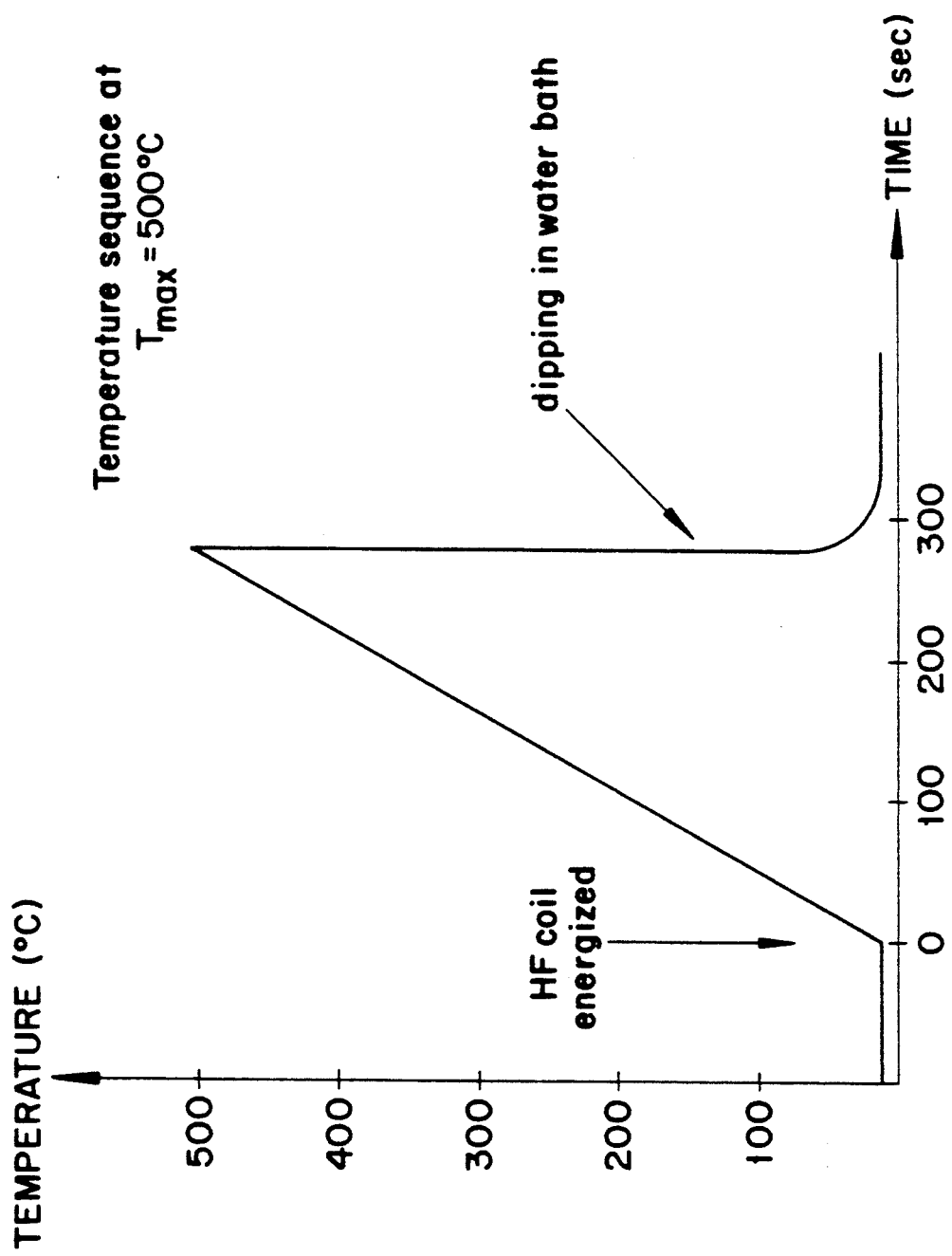
FIG. 2 is a graph of time vs. temperature showing the thermal cycling to which samples are subjected.

A composite bar was made consisting of the selected alloys as the outer component and carbon steel as the inner component. The manufacture was made pursuant to the same procedure for making composite tubes, i.e., initial preparation of cylindrical blanks, extrusion, straightening, pickling and heat treatment. The final dimension of this composite bar is outer diameter 18.2 mm with an external layer of 0.6 mm. Samples of each composite tube having a length of 300 mm were cut off and thereafter subjected to heat treatment conventional for composite tubes. These test samples were then exposed to thermal cycling in a suitable conventional facility. For all these tests, thermoelements are attached to the samples. The bar is heated in an HF-coil after which it is automatically sunk into a water tank (T=+5 to +20° C.) to carry out rapid cooling. The temperature sequence is illustrated in FIG. 2.

The testing was interrupted after every 100–200 cycles and inspection for detecting external cracks was made. If crack formation had occurred, the testing was stopped and the sample was cut apart for a closer study of the structure of the cracks. If no crack formation could be observed the testing was continued, however, not longer than 1000 cycles.

In Table 1 below the testing results are summarized wherein the material combination of the invention is designated 20Cr-38Ni-2.6Mo/SS1435, in which the numbers 20, 38 and 2.6 correspond with the nominal content of each element in weight-%.

The material combination SANDVIK SAF 2304/SS1435 refers to a conventional carbon steel with a standard designation SS1435 whereas the outer component is a ferritic-austenitic stainless steel containing 23% CR and 4% Ni, more specifically described in U.S. Pat. No. 4,798,635, hereinafter incorporated by reference.

TABLE 1

| Material Combination | Maximum temperature during cycling | | | |
|---|---|---|---|---|
| | 400° C. | 500° C. | 600° C. | 700° C. |
| SS2352/SS1435 | * | Cracks** 300–500 cy | Cracks 300–500 cy | |
| SS2324/SS1435 | * | Cracks ≈ 300 cy | Cracks ≈ 300 cy | |
| SANDVIK SAF 2304/SS1435 | * | Cracks 200–700 cy | Cracks ≈ 200 cy | |
| 20Cr—38Ni—2.6Mo/SS1435 | * | * | * | Cracks ≈ 500 cy |
| 30Cr—60Ni/SS1435 | * | * | Cracks 700–800 cy | |

*No cracks after 100 cycles
**Cracks here mean that the characteristic "fish net" pattern has been developed and crack growth is initiated.

From this table it appears that the combinations having outer components of 20Cr-38Ni-2.6Mo and 30Cr-60Ni have better resistance than the today commonly used SS2352/SS1435 and the first mentioned appears to be the best. SANDVIK SAF 2304 corresponds to UNS S32304, alloy 20Cr-38Ni-2.6Mo has a composition according to UNS N08825 and the alloy 30Cr60Ni has a composition according to UNS N06690.

In addition to this test, all outer components were also tested in regard of low cycling fatigue at 600° C. and 700° C. respectively. The results are shown in FIGS. 3 and 4. The legend "$\epsilon_t$" in these Figures means total elongation including both plastic and elastic elongation. Low cycling fatigue is a measure of the outer component's ability to withstand the thermal stress variations that might occur in a bottom tube. It appears from these results that 20Cr-38Ni-2.6Mo has somewhat better resistance than SS2352.

The stresses that occur in a compound tube are caused partly by the inner excess pressure and partly by the thermal stresses. The size of the thermal stresses are directly depending of the differences in thermal linear expansion between the outer and inner components. The coefficient of linear expansion for each component is shown in Table 2.

TABLE 2

| Material | Linear Expansion [×10⁻⁶] | | | | | |
|---|---|---|---|---|---|---|
| | 20–100° C. | 20–200° C. | 20–300° C. | 20–400° C. | 20–500° C. | 20–600° C. |
| SS2352 | 16.7 | 17.3 | 17.8 | 18.1 | 18.4 | 18.8 |
| SS2324 | 13.0 | 13.5 | 14.0 | 14.5 | 14.8 | |
| SANDVIK SAF 2304 | 13.0 | 13.5 | 14.0 | 14.5 | 14.8 | |
| 20Cr—38Ni—2.6Mo | 14.2 | 14.6 | 14.9 | 15.1 | 15.3 | 15.4 |
| 30Cr—60Ni | 14.1 | 14.3 | 14.5 | 14.8 | 15.2 | 15.7 |
| SS1435 | 12.5 | 13.0 | 13.5 | 14.0 | 14.3 | 14.6 |

The difference in the linear expansion between the different outer components and the inner carbon steel appears from Table 3.

TABLE 3

| Material | Difference in Coefficient of Linear Expansion | | | | | |
|---|---|---|---|---|---|---|
| | 20–100° C. | 20–200° C. | 20–300° C. | 20–400° C. | 20–500° C. | 20–600° C. |
| SS2352-SS1435 | 4.2 | 4.3 | 4.3 | 4.1 | 4.1 | 4.2 |
| SS2324-SS1435 | 0.5 | 0.5 | 0.5 | 0.5 | 0.5 | |
| SANDVIK SAF 2304-SS1435 | 0.5 | 0.5 | 0.5 | 0.5 | 0.5 | |
| 20Cr—38Ni—2.6Mo-SS1435 | 1.7 | 1.6 | 1.4 | 0.9 | 1.0 | 0.8 |
| 30Cr—60Ni-S1435 | 1.6 | 1.3 | 1.0 | 0.8 | 0.9 | 1.1 |

It appears from this table that the presently mostly used combination of SS2352-SS1435 has much larger difference in terms of coefficient of linear expansion than compared with the other combinations included in this test.

Hence, a temperature increase with 600° C. would give a thermal elongation of 0.24% between SS2352 and SS1435, 0.8% between SS2324 and SS1435 and 0.05% between 20Cr-38Ni-2.6Mo and SS1435. These values are obtained when same temperature is achieved in both components. With the rapid heating and cooling sequences that occur during testing in the thermal cycling, the thermal elongations will be larger due to the temperature gradients in the bar. At any case, these elongation values will, in combination with the low cycling fatigue results, be an explanation as to why the combinations with 20Cr-38Ni-2.6Mo and 30Cr-60Ni appear with better resistance to thermal fatigue than SS2352. It also appears that only a small difference in longitudinal expansion will not give better resistance since the combinations with SANDVIK SAF 2304 and SS2324 externally do not appear to give any significantly better resistance than SS2352. It is probable that the difference in embrittlement tendency between SS2324, SANDVIK SAF 2304 and 20Cr-38Ni-2.6Mo, 30Cr-60Ni is one part of the explanation of the better resistance of the latter ones. Another reason why the combination 20Cr-38Ni-2.6Mo-carbon steel would be suitable resides in the fact that with strength theory it is possible to show that both components of a composite tube are in the elasticity range within a temperature range as per equation 1 below:

$$\Delta T = 2 \cdot \sigma_{sy} \cdot (1 - \gamma)/E \cdot \frac{1}{\alpha_y - \alpha_i} (1 + t_y/t_i) \qquad (1)$$

where
$\Delta T$ = temperature range in which both components are in the range of elasticity
$\sigma_{sy}$ = yield point of outer component (corresponds approximately to $R_p 0.2$)
$\gamma$ = Poisson's ratio
$E$ = elasticity module
$\alpha_y$ = coefficient of linear expansion of outer component
$\alpha_i$ = coefficient of linear expansion of inner component
$t_y$ = layer thickness of outer component
$t_i$ = layer thickness of inner component
For a composite tube with normal dimension in a soda recovery unit, i.e., with outer diameter 63.5 mm, outer layer thickness 1.65 mm and a total wall thickness of about 7 mm, it is possible to calculate ΔT to be about 350° C. for SS2352-SS1435 and about 1500° C. for 20Cr-38Ni-2.6Mo-SS1435. In reality, the latter interval is not so large due to certain assumptions for equation 1. Theory shows, however, that the latter combination is in the elasticity range within a substantially larger temperature range than with SS2352-SS1435. This is advantageous, partly from the fatigue perspective and partly from the corrosion perspective because the risk that an accidental excess temperature in the bottom of said soda recovery unit should result in an unfavorable stress distribution is substantially reduced.

In addition to improved stress distribution and better thermal fatigue resistance the combination of 20Cr-38Ni-2.6Mo also has a documented improved resistance to chloride and hydroxide induced stress corrosion than compared with SS2352.

Although I do not wish to be bound by the above explanations, they are believed to account for the improved performance of the composite tube of the present invention.

While various thicknesses of each tube which make up the composite tube of the present invention can be used, generally, the outer portion of 20Cr-38Ni-2.6Mo comprises about 15 to 25%, preferably about 20 to 30%, by weight, of the total thickness of the tube, the remainder being the inner tube of carbon steel. The fatigue resistance of the composite tube is, for practical reasons, rather independent of the outer portion of the tube. This outer portion is, of course, more expensive than the carbon steel inner portion but the major costs associated with the product are related to forming a proper composite tube, e.g., co-extrusion and quality assurance. Nonetheless, the composite tube of the present invention offers a substantially improved life over the bottom tubes conventionally used.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. In a soda recovery unit having bottom tubes of a carbon steel, the improvement comprising using as the bottom tubes a composite tube comprising an inner portion of carbon steel and an outer portion of an austenitic Cr—Ni—Mo—Fe-based alloy comprising, in weight %:

| | |
|---|---|
| C | 0.01–0.04 |
| Cr | 19.5–23.5 |
| Ni | 38–46 |
| Mo | 2.5–3.5 |
| Si | up to 0.5 |
| N | up to 0.3 |
| Fe | remainder (except normal impurities). |

2. In the soda recovery unit of claim 1, the further improvement wherein the composite tube is manufactured by joint extrusion of a carbon steel tube and an outer liner tube of said Cr—Ni—Mo—Fe-based alloy.

3. In the soda recovery unit of claim 1, the further improvement wherein the outer portion comprises, in weight-%, 0.01–0.04 C, 20 Cr, 38 Ni, 2.6 Mo and the remainder being Fe except normal impurities.

* * * * *

REEXAMINATION CERTIFICATE (3613rd)
United States Patent [19]

Rosen

[11] B1 5,324,595
[45] Certificate Issued Aug. 25, 1998

[54] COMPOSITE TUBE

[75] Inventor: Jonas Rosen, Sandviken, Sweden

[73] Assignee: Sandvik AB, Sandviken, Sweden

Reexamination Request:
No. 90/004,584, Mar. 19, 1997

Reexamination Certificate for:
Patent No.: 5,324,595
Issued: Jun. 28, 1994
Appl. No.: 932,692
Filed: Aug. 20, 1992

[30] Foreign Application Priority Data

Aug. 21, 1991 [SE] Sweden ................. 9102410

[51] Int. Cl.$^6$ .................. F16L 9/02; B32B 1/08; B32B 15/18
[52] U.S. Cl. .............. 428/679; 428/683; 428/685; 138/143
[58] Field of Search .................. 428/679, 678, 428/586, 685, 683; 138/142, 143

[56] References Cited

PUBLICATIONS

Sandvik Publication No. S–12126–ENG, Sandvik 825/CS Composite Tube, Mar. 1991.
Sandvik Publication No. S–1219–ENG, Composite Tubes for Black Liquor Recovery Boilers, Feb. 1988.
Oldelstam, BLRB Composite Tubes—15 Years of Experience, 1989 Kraft Recovery Operations (1989) (no month), 301–312.
Oldelstam et al., Air Port Corrosion of Composite Tubes in Kraft Recovery Boilers, 1987 Engineering Conference, (1987) (no month), pp. 585–590.
Barna et al., Corrosion Experience in Black Liquor Recovery Boilers, (no month) 1989 Kraft Recovery Operations, pp. 267–282.
Barna et al., Recovery Boiler Corrosion is Due to Complex Mechanism and Conditions, Pulp and Paper (1989) (Jun.), pp. 90–98.
Oldelstam, Experience with Composite Tubes in BLRB and other Boilers, Corrosion 85, Paper No. 173, pp. 173/1–173/12, (Mar. 1985).
Tran et al., Fireside Corrosion in Kraft Recovery Boiler—An Overview, Environment Treatment & Control, (1988) (Jul.), pp. 40–46.
Barna et al., Corrosion of Composite Port Opening Tubes in Recovery Boilers: Appearance and Occurrence, 1986 Engineering Conference, (1986) (no month), pp. 377–385.
Tran et al., Fireside Corrosion in Kraft Recovery Boilers—An Overview of the Effect of Deposit and Flue Gas Chemistry, Corrosion 88, (1988) (Mar.), Paper No. 437, pp. 437/1–437/17.
Tran et al., Fireside Corrosion in Kraft Recovery Boilers—An Overview of Chemistry 1989 Kraft Recovery Operations (1989) (no month), pp. 283–290.
Grace, Composite Tubes: Current material of choice for the lower furnace, PIMA (1989) (Oct.), pp. 45–46.

*Primary Examiner*—John J. Zimmerman

[57] ABSTRACT

A composite tube with improved resistance to thermal fatigue and stress corrosion for use in soda recovery units comprising an inner tubing of a conventional carbon steel and an outer liner of a Cr—Ni—Mo—Fe-based alloy with austenitic structure which alloy contains, in weight-%, 0.01–0.04 C, 19.5–23.5 Cr, 38–46 Ni, 2.5–3.5 Mo, up to 0.5 Si, up to 0.3N, and the remainder being Fe, except normal impurities.

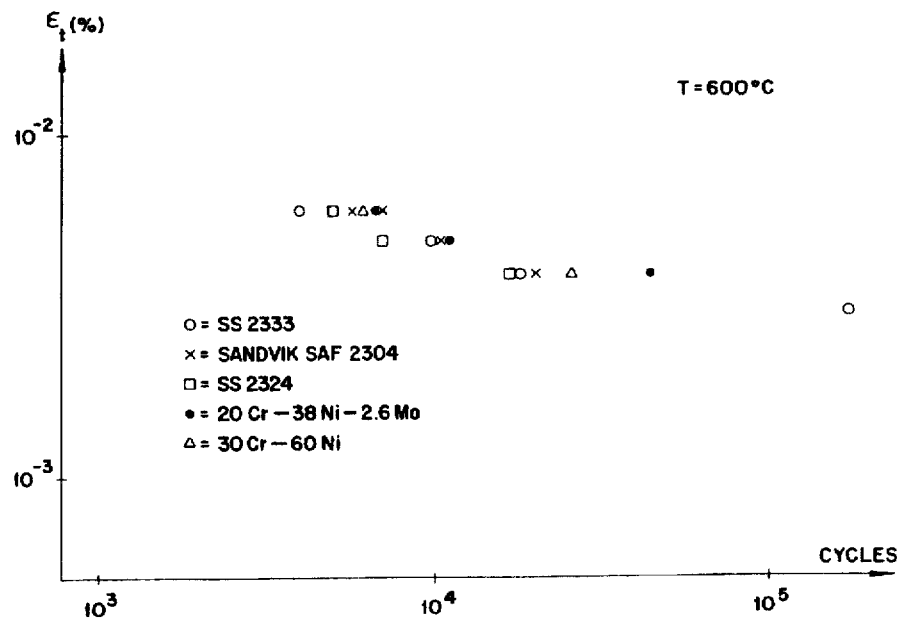

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 is confirmed.

* * * * *